(12) United States Patent
Dean

(10) Patent No.: US 10,230,127 B2
(45) Date of Patent: Mar. 12, 2019

(54) COMPONENTS AND METHODS FOR MANUFACTURE AND ASSEMBLY OF A FUEL CELL STACK

(71) Applicant: LG Fuel Cell Systems Inc., North Canton, OH (US)

(72) Inventor: Eric Dean, Mickleover (GB)

(73) Assignee: LG FUEL CELL SYSTEMS INC., North Canton, OH (US)

(*) Notice: Subject to any disclaimer, the term of this patent is extended or adjusted under 35 U.S.C. 154(b) by 100 days.

(21) Appl. No.: 14/801,658

(22) Filed: Jul. 16, 2015

(65) Prior Publication Data

US 2016/0141706 A1 May 19, 2016

(30) Foreign Application Priority Data

Nov. 17, 2014 (GB) .................................. 1420379.8

(51) Int. Cl.
*H01M 8/2485* (2016.01)
*H01M 8/0252* (2016.01)
*H01M 8/243* (2016.01)
*H01M 8/00* (2016.01)
*H01M 8/12* (2016.01)
*H01M 8/124* (2016.01)

(52) U.S. Cl.
CPC ......... *H01M 8/2485* (2013.01); *H01M 8/004* (2013.01); *H01M 8/12* (2013.01); *H01M 8/243* (2013.01); *H01M 2008/1293* (2013.01); *H01M 2300/0074* (2013.01); *Y02P 70/56* (2015.11)

(58) Field of Classification Search
CPC ......... H01M 2008/1293; H01M 8/004; H01M 8/243; H01M 8/2485
See application file for complete search history.

(56) References Cited

U.S. PATENT DOCUMENTS

| 5,750,281 A | 5/1998 | Washington et al. |
| 5,807,642 A * | 9/1998 | Xue ...................... C04B 35/465 |
| | | 429/458 |
| 2003/0235745 A1* | 12/2003 | Mook ................. H01M 8/0282 |
| | | 429/425 |

(Continued)

FOREIGN PATENT DOCUMENTS

| EP | 0562724 A2 | 9/1993 |
| EP | 0668622 B1 | 4/1998 |
| EP | 1603183 A1 | 12/2005 |

(Continued)

OTHER PUBLICATIONS

International Search Report and Written Opinion from counterpart PCT Application No. PCT/GB2015/053449, dated Jan. 22, 2016, 14 pp.

(Continued)

*Primary Examiner* — Lucas J. O'Donnell
(74) *Attorney, Agent, or Firm* — Dentons US LLP

(57) ABSTRACT

A fuel cell stack which is amenable to simple manufacturing processes and is thermally and mechanically compliant. The fuel cell stack reduces the number of components by combing fuel cell tubes to form tube sub-assemblies, the tube sub-assemblies comprising end fittings connected to the fuel cell tubes, the end fittings provided with at least one or preferably a plurality of channels to provide equal distribution of fuel throughout the fuel cell tubes.

19 Claims, 24 Drawing Sheets

(56) References Cited

U.S. PATENT DOCUMENTS

2004/0076867 A1* 4/2004 Day .................... H01M 8/0206
                                                                429/481
2012/0094217 A1   4/2012 Watanabe et al.

FOREIGN PATENT DOCUMENTS

| EP | 1419547 B1 | 4/2008 |
| EP | 2221908 A1 | 8/2010 |
| EP | 2296212 A1 | 3/2011 |
| JP | 2005166470 | 6/2005 |
| JP | 2013030442 | 2/2013 |
| KR | 20110094448 | 8/2011 |
| WO | 03071624 A2 | 8/2003 |

OTHER PUBLICATIONS

Search and Examination Report from counterpart GB Application No. GB1420379.8, dated Sep. 14, 2015, 11 pp.

* cited by examiner

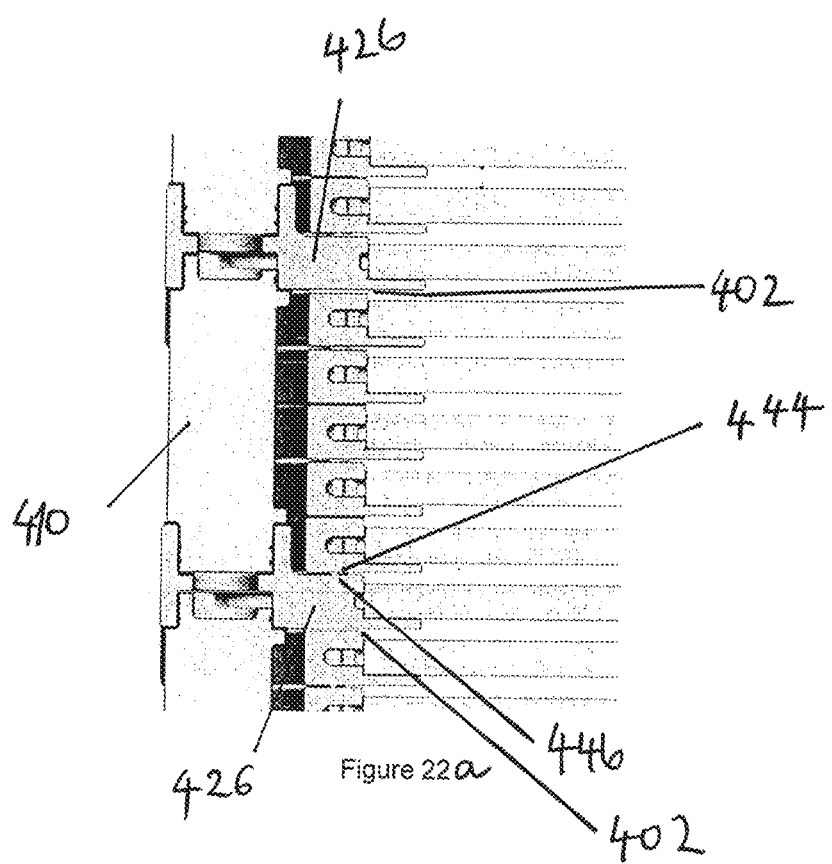

COMPONENTS AND METHODS FOR MANUFACTURE AND ASSEMBLY OF A FUEL CELL STACK

CROSS REFERENCE TO RELATED APPLICATION

This application claims priority to GB Application No. 1420379.8, filed Nov. 17, 2014, which is incorporated by reference herein in its entirety.

There is disclosed components and methods for manufacture and assembly of a fuel cell stack which is amenable to simple manufacturing procedures and is thermally and mechanically compliant.

Currently the main variants of the solid oxide fuel cell are the tubular solid oxide fuel cell (T-SOFC), the planar solid oxide fuel cell (P-SOFC) and the monolithic solid oxide fuel cell (M-SOFC).

The tubular solid oxide fuel cell comprises a tubular solid oxide electrolyte member which has inner and outer electrodes. Typically the inner electrode is the cathode and the outer electrode is the anode. An oxidant gas is supplied to the cathode in the interior of the tubular solid oxide electrolyte member and a fuel gas is supplied to the anode on the exterior surface of the tubular solid oxide electrolyte member. (This may also be reversed.) The tubular solid oxide fuel cell allows a simple cell stacking arrangement and is substantially devoid of seals. However, the fabrication of this type of solid oxide fuel cell is very sophisticated, manpower intensive and costly. Also this type of solid oxide fuel cell has a relatively low power density due to long current conduction paths through the relatively large diameter tubular cells.

The monolithic solid oxide fuel cell has two variants. The first variant has a planar solid oxide electrolyte member which has electrodes on its two major surfaces. The second variant has a corrugated solid oxide electrolyte member which has electrodes on its two major surfaces. The monolithic solid oxide fuel cell is amenable to the more simple tape casting and calendar rolling fabrication processes and promises higher power densities. This type of solid oxide fuel cell requires the co-sintering of all the fuel cell layers in the monolith from their green states. However, this results in serious shrinkage and cracking problems. This type of solid oxide fuel cell is not so easy to manifold and seal.

The planar solid oxide fuel cell is also amenable to tape casting and rolling fabrication processes. Currently it requires thick, 150-200 µm, self-supported solid oxide electrolyte members which limit performance. The planar solid oxide fuel cell also has limited thermal shock resistance.

Solid oxide fuel cells require operating temperatures of around 700° C. to around 1000° C. to achieve the required electrolyte performance within the active fuel cells.

The operating temperature of a solid oxide fuel cell stack is in principle high enough for steam reforming of a hydrocarbon fuel internally of the solid oxide fuel cell stack. Internal steam reforming would simplify the balance of a solid oxide fuel cell power stack and improve operating efficiency. However, reforming of a hydrocarbon fuel within the solid oxide fuel cell stack has a number of problems which have not been overcome. Full internal reforming of the hydrocarbon fuel in solid oxide fuel cell stacks is precluded by the strongly endothermic nature of the steam reforming reaction, and consequential thermal shocking of the delicate fuel cells. Internal reforming on nickel cermet anodes in solid oxide fuel cells tends to catalyse carbon formation.

The present invention seeks to provide a novel solid oxide fuel cell stack which is amenable to simple manufacturing procedures and is thermally and mechanically compliant.

BACKGROUND

EP0668622B1 discloses a solid oxide fuel cell which comprises a plurality of modules. Some of these modules comprise hollow members, which have two parallel flat surfaces upon which the solid oxide fuel cells are arranged. The opposite ends of each module are connected to reactant manifolds by compliant bellow connections.

However, such an arrangement does not provide sufficient thermal and mechanical compliance in the solid oxide fuel cell stack to minimise the mechanical and thermal stresses in the solid oxide fuel cell stack.

EP1419547B1 discloses a solid oxide fuel cell stack, which comprises a plurality of modules. The modules comprise elongate hollow members, the hollow members having a passage for flow of reactant. The modules are arranged so that at least one end of each module is connected to an end of an adjacent module to allow reactant to flow sequentially through the modules in a serpentine type arrangement.

However, the arrangement does not provide sufficient thermal and mechanical compliance to prevent thermal and mechanical stresses building up near the elongate hollow members. Furthermore, inspecting the modules for joint leakage, geometrical accuracy and reactant pressure drop across the module prior to installation in the stack is difficult.

BRIEF SUMMARY

According to a first aspect, there is provided a solid oxide fuel cell stack comprising of at least one fuel cell strip, each strip comprising a plurality of bundles, each bundle comprising a plurality of tube sub-assemblies, each tube sub-assembly comprising a fuel cell tube, each fuel cell tube having at least one passage extending longitudinally through the fuel cell tube, adjacent tube sub-assemblies being arranged substantially parallel and spaced apart, at least one end of each tube sub-assembly being connected to an end of an adjacent tube sub-assembly via at least one end fitting, wherein the at least one end fitting comprises at least one channel.

A benefit of providing a plurality of channels within the end fitting is that the channel geometry may be adapted to control fuel flow through the plurality of channels and into the fuel cell tube. Surprisingly, it has been found that micro-control of the flow of fuel in a bottom up approach (i.e. from the fuel cell tube up to the fuel cell strip) reduces thermal and mechanical stresses on the fragile fuel cell tubes and other components. Controlling the distribution of the flow of fuel throughout the fuel cell tube sub-assemblies prevents fuel surges and pressure differences in fuel flow within the tube sub-assemblies.

Optionally, the at least one end fitting comprises a plurality of channels.

Optionally, the at least one end fitting comprises a fuel inlet or a fuel outlet.

Optionally, the at least one channel forms a gas tight conduit from the fuel inlet or the fuel outlet to the fuel cell tubes.

Optionally, the at least one channel has a length and wherein a cross sectional area of the at least one channel is a function of the length of the at least one channel.

Optionally, a coefficient of thermal expansion (CTE) of the at least one end fitting is matched to a CTE of the solid oxide fuel cell tubes.

Optionally, the at least one end fitting is made from impervious magnesia magnesium aluminate (MMA) ceramic material.

Optionally, one end of each tube sub-assembly comprises a first type end fitting, the opposing end of each tube sub-assembly comprises a second type end fitting, and wherein the first type end fitting of one tube sub-assembly and the second type end fitting of an adjacent tube sub-assembly are connected to provide a conduit between the fuel cell tubes of adjacent tube sub-assemblies.

Optionally, the first type end fitting has a first alignment feature compatible with a second alignment feature of the adjoining second type end fitting, providing alignment between adjacent first type end fitting and the second type end fitting.

Optionally, the first alignment feature is a central spigot forming the fuel inlet or the fuel outlet of the first type end fitting and the second alignment feature is a central location socket forming the fuel inlet or the fuel outlet of the second type end fitting.

Optionally, the central spigot and the central location socket connect to form a conduit between the first type end fitting and the second type end fitting.

Optionally, the central spigot has a glass ceramic tape cast sealing gasket to provide a gas tight bond with the central location socket.

Optionally, the end fitting comprises first and second sealing faces being substantially perpendicular, wherein the first and second sealing faces provide a ledge to support the fuel cell tubes.

Optionally, the fuel cell tubes are connected to the ledge to form a gas tight connection between the fuel cell tubes and the end fitting.

Optionally, a depth of the second sealing face is greater than the fuel cell tube thickness providing a clearance between the fuel cell tubes of one tube sub-assembly and the end fitting of an adjacent tube sub-assembly.

Optionally, the first sealing face has a tube edge alignment spigot.

Optionally, the second sealing face has a tube edge alignment spigot.

Optionally, the first type end fitting has an upper mounting surface and a lower abutting surface for mounting and abutting adjacent end fittings.

Optionally, the second type end fitting has an upper abutting surface and a lower mounting surface for abutting and mounting adjacent end fittings.

Optionally, wherein the upper mounting surface of the first type end fitting is fixed to lower mounting surface of the adjacent second type end fitting to form a bonded joint there between.

Optionally, the upper mounting surface and/or the lower mounting surface are provided with a bond control pad to control the thickness of the bonded joint between adjacent end fittings.

Optionally, the bonded joint is bonded with a ceramic glass paste.

Optionally, the lower abutting surface of the first end fitting is provided with a location socket.

Optionally, the upper abutting surface of the second type end fitting is provided with a location pin.

Optionally, the location socket is cylindrical and is adapted to constrain latitudinal motion between adjacent tube sub-assemblies and to allow longitudinal motion between adjacent tube sub-assemblies.

Optionally, the location pin is cylindrical.

According to a second aspect, there is provided a solid oxide fuel cell stack comprising at least one fuel cell strip, each strip comprising a plurality of bundles, each bundle comprising a plurality of tube sub-assemblies, each tube sub-assembly comprising a fuel cell tube, each fuel cell tube having at least one passage extending longitudinally through the fuel cell tube, adjacent tube sub-assemblies being arranged substantially parallel and spaced apart, at least one end of each tube sub-assembly being connected to an end of an adjacent tube sub-assembly via at least one end fitting, an end of an uppermost tube sub-assembly and an end of a lowermost tube sub-assembly of each bundle each being provided with a fuel manifold end fitting, wherein the fuel manifold end fitting comprises at least one channel, the channel connecting the end of the fuel cell tube of the uppermost tube sub-assembly and the end of the fuel cell tube of the lowermost tube sub-assembly of each bundle to respective fuel cell strip fuel pipes.

Preferably, the fuel manifold end fitting comprises a plurality of channels. By providing a plurality of channels within the fuel manifold end fittings, the flow of fuel from a main fuel cell strip fuel pipe to the fuel cell tubes of the tube sub-assemblies including the flow of fuel to individual channels within the fuel cell tubes may be controlled. In addition the plurality of channels within the fuel manifold end fittings controls the flow of fuel to each of the individual fuel cell bundles within the fuel cell strip.

Optionally, wherein the at least one channel has a length and wherein a cross sectional area of the at least one channel is a function of the length of the at least one channel.

Optionally, the main strip fuel pipe is an inlet feed pipe.

Optionally, the main strip fuel pipe is an outlet feed pipe.

Optionally, a coefficient of thermal expansion (CTE) of the fuel manifold end fitting is matched to a CTE of the solid oxide fuel cell tubes.

Optionally, the fuel manifold end fitting is made from impervious magnesia magnesium aluminate (MMA) ceramic material.

Optionally, the inlet feed pipe and the outlet feed pipe are made from dense impervious ceramic material.

According to a third aspect, there is provided a fuel manifold end fitting comprising at least one channel, the channel configured for connecting a fuel cell tube of an end of an uppermost tube sub-assembly of a bundle to a first main strip fuel pipe and an end of a lowermost tube sub-assembly of the bundle to a second main strip fuel pipe.

BRIEF DESCRIPTION OF THE DRAWINGS

Embodiments of the invention are further described hereinafter with reference to the accompanying drawings, in which:

FIGS. 22a, 22b and 22c shows sections through a strip assembly.

DETAILED DESCRIPTION

In the described embodiments, like features have been identified with like numerals, albeit in some cases having increments of integer multiples of 100. For example, in different figures, 34, 234, and 334 have been used to indicate a reactant manifold.

Figure 1:
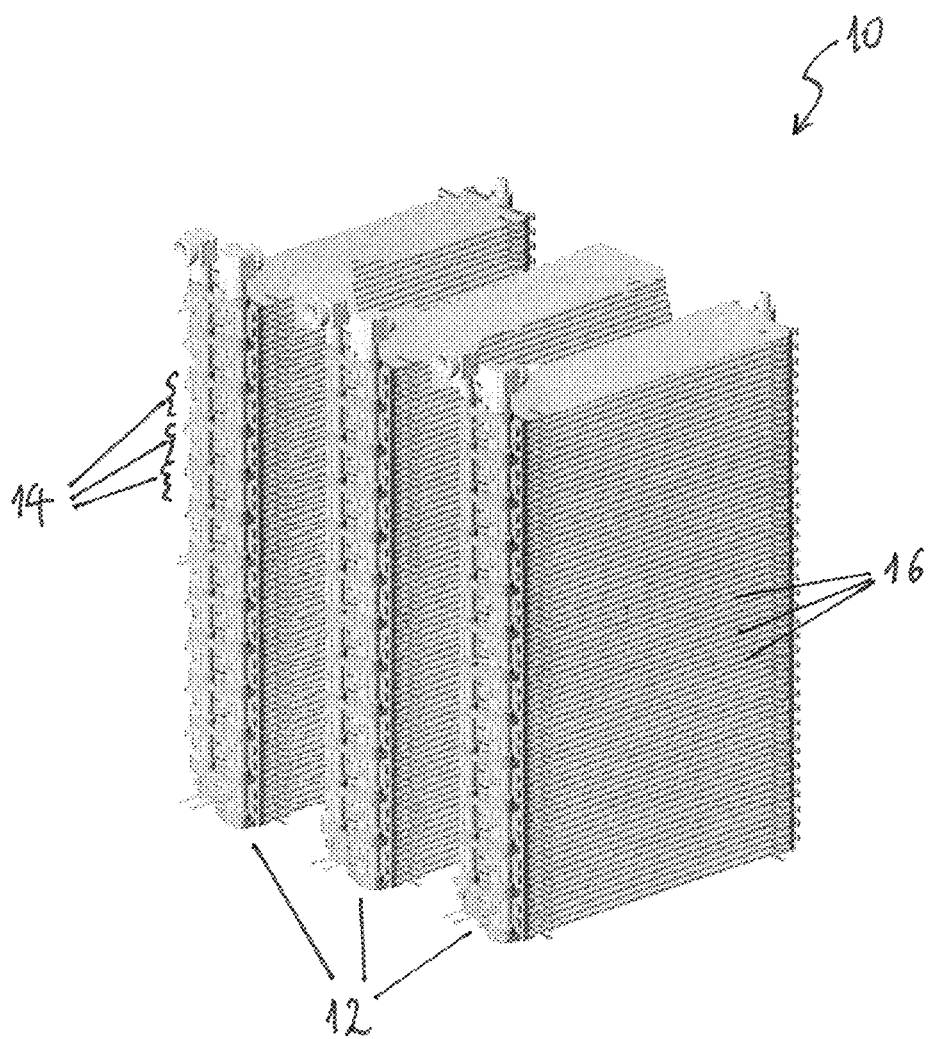
FIG. 1 shows a solid oxide fuel cell stack.

A solid oxide fuel cell stack 10 comprises at least one fuel cell strip 12, each strip 12 comprises a plurality of bundles 14, and the bundles 14 are arranged substantially parallel to each other as shown in FIG. 1. Each bundle 14 comprises a plurality of tube sub-assemblies 16, and each tube sub-assembly 16 comprises a fuel cell tube 18 incorporating a plurality of fuel cells.

Figure 2:
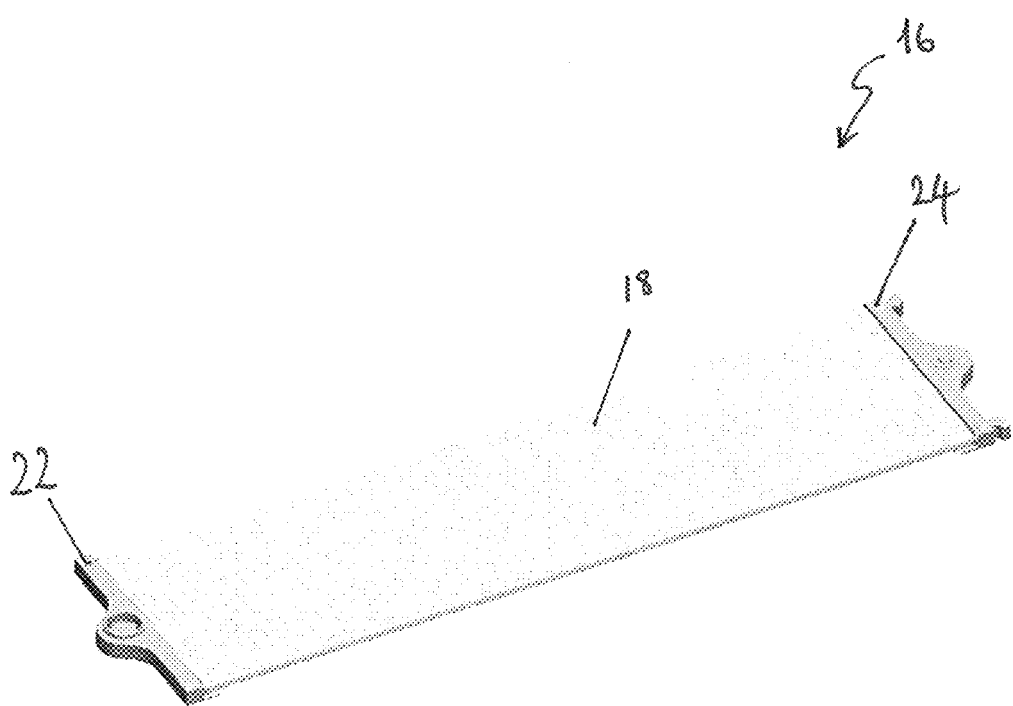
FIG. 2 shows a fuel cell tube sub-assembly.
Figure 3:
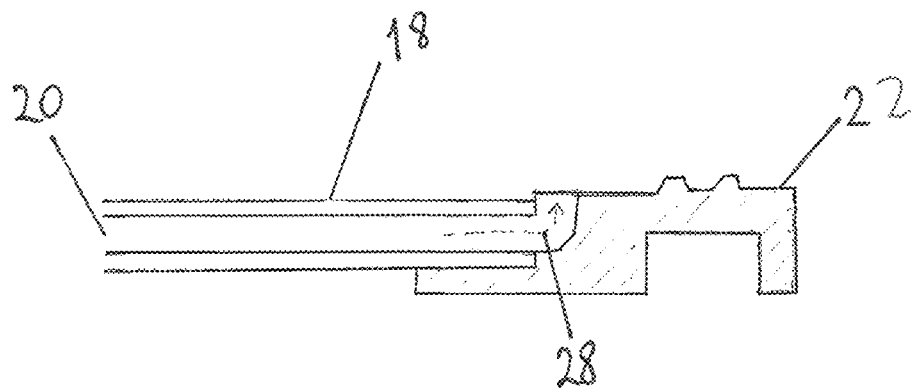
FIG. 3 shows a section view of a fuel cell tube adjoining an end fitting forming a fuel flow channel through the end fitting a fuel cell tube sub-assembly of FIG. 2.

FIG. 2 shows a tube sub-assembly 16 comprising a fuel cell tube 18 connected to end fittings 22, 24. FIG. 3 shows a fuel cell tube 18 connected to an end fitting 22. The fuel cell tube 18 has at least one passage 20 extending longitudinally through the fuel cell tube 18 for flow of reactant, the flow path through the tube 18 and the end fitting 22 shown by arrow 28.

The fuel cell tubes are formed from porous magnesia magnesium aluminate (MMA) tubes and are shown without the detail of the individual fuel cells. Adjacent tube sub-assemblies 16 are arranged substantially parallel to one another and spaced apart such that the fuel cell tube 18 of one fuel cell tube sub-assembly 16 does not touch the fuel cell tube 18 of an adjacent tube sub-assembly 16. The spacing between fuel cell tubes 18 of adjacent tube sub-assemblies allows oxidant to flow between the fuel cell tubes during operation.

The tube sub-assembly 16 is connected to an adjacent tube sub-assembly via an end fitting 22, 24. The benefits of using end fittings in combination with the fuel cell tubes to make a tube sub-assembly 16 are numerous and include reducing the number of parts required when constructing the fuel cell strip 12. As such, the tube sub-assembly 16 is considered as a single part. Constructing the stack in a modular manner negates the need for complex fuel cell tube sealing procedures. Furthermore, the tube sub-assembly may be tested for mechanical and thermal compliance prior to installation, reducing the risk of failure of an individual tube sub-assembly post-installation. The fuel cell tube is arranged between opposing end fittings 22, 24 and the fuel cell tube is sealed to the end fittings using a bond to create a sealed unit, the end fitting forming a gas tight path 28 between the fuel cell tube and the end fitting.

Figure 4:
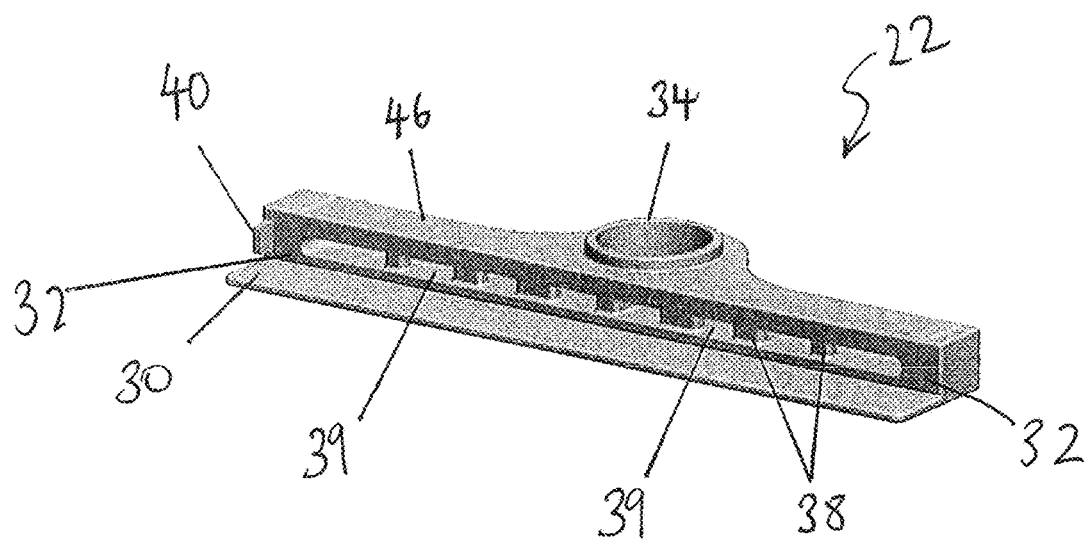
FIG. 4 shows a first end fitting.
Figure 5:
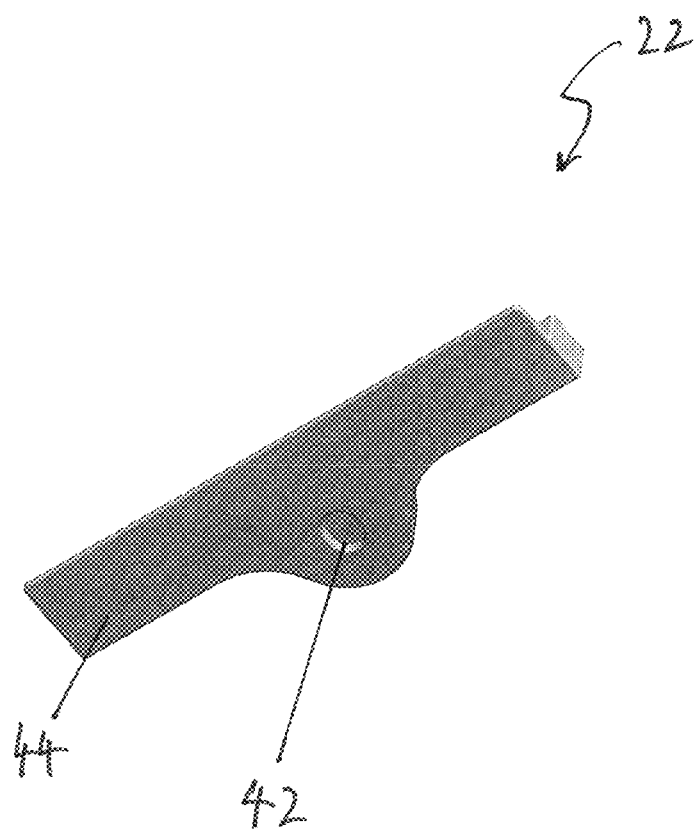
FIG. 5 shows a first end fitting.
Figure 6:
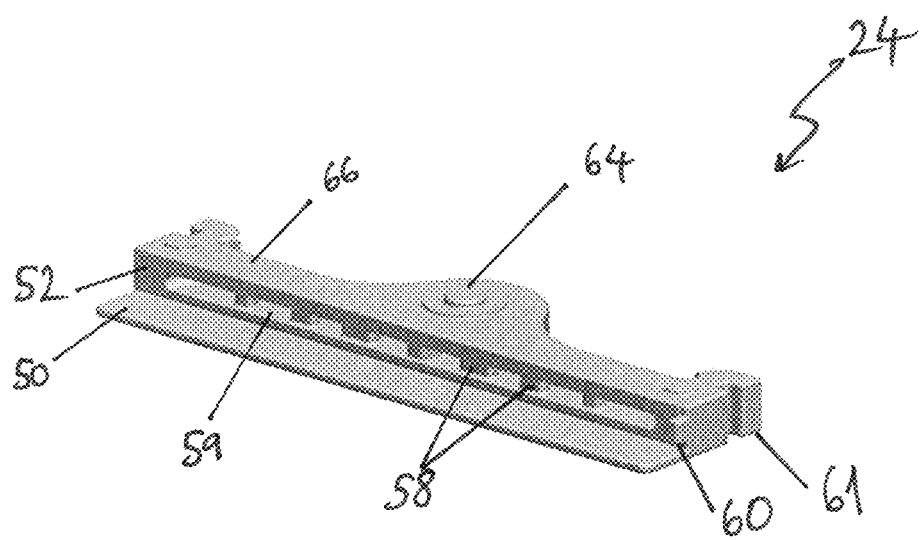
FIG. 6 shows a second end fitting.
Figure 7:
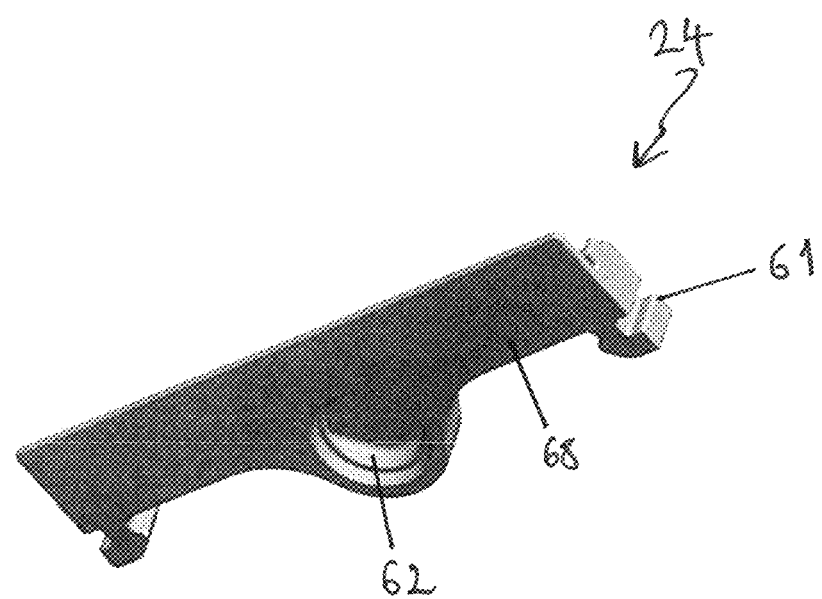
FIG. 7 shows a second end fitting.
Figure 8:
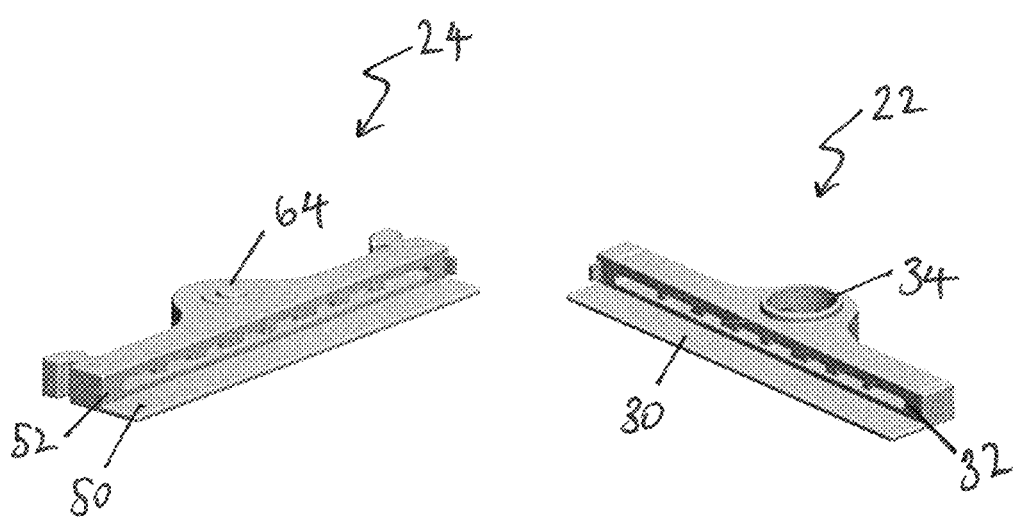
FIG. 8 shows views of first and the second end fittings.

Several types of end fitting are required to produce a fuel cell bundle. A first type end fitting 22 is shown in FIGS. 3, 4 and 5. A second type end fitting 24 is shown in FIGS. 6 and 7. The first and second type end fittings couple together as shown in FIG. 8 to form a conduit between the fuel cell tubes of adjacent tube sub-assemblies, and the complete end fittings (i.e. a first type end fitting coupled with a second type end fitting) connect one end of a first tube sub-assembly with an end of an adjacent tube sub-assembly.

Fuel manifold end fittings are required to terminate the upper most tube sub-assembly and the lowermost tube sub-assembly and to connect each bundle to the fuel feed pipe and the fuel outlet pipe. The fuel manifold end fittings are described in more detail below.

The first type end fitting 22 and the second type end fitting 24 adjoin to provide a gas tight channel between the adjacent tube sub-assemblies 16 and to allow reactant to flow sequentially through the tube sub-assemblies 16. The fuel cell tubes 18 of adjacent tube sub-assemblies 16 do not touch each other and consequently, mechanical stresses and thermal stresses are not compounded within the fuel cell tubes 18 of adjacent tube sub-assemblies 16. Instead, thermal and mechanical stresses are propagated through the end fittings 22, 24 of the tube sub-assemblies. The end fittings 22, 24 are designed to withstand the thermal and mechanical stresses and the end fittings are far less delicate than the fuel cell tubes 18. Therefore, mechanical and thermal stresses do not build up in the fuel cell tubes of the bundles. In this arrangement, thermal and mechanical stresses in the fuel cell strip 12 are reduced.

Furthermore, using end fittings as part of the tube sub-assemblies 16 enables tube sub-assemblies 16 to be manufactured without requiring subsequent sealing processes within the fuel cell strip. The tube sub-assemblies 16 may be inspected for joint leakage, geometrical accuracy, and pressure drop through the tube sub-assembly prior to installation of the tube sub-assembly within a bundle. Mechanical and thermal stresses are reduced in the overall stack in part due to improving manufacturing tolerances in the tube sub-assembly 16.

Manufacturing the tube sub-assemblies 16 in isolation from the manufacture of the bundles 14 or the strip 12 provides an opportunity to identify and address defects within the fuel cell tube 18 of each tube sub-assembly since the tube sub-assembly 16 can be tested for leaks prior to installation in the more complex stack.

Referring now to FIGS. 4 to 7, the first end fitting 22 and the second end fitting 24 are shown having a first sealing face 30, 50 and a second sealing face 32, 52 for mounting a fuel cell tube 18 onto the end fittings. The first sealing face and second sealing face are substantially perpendicular with respect to each other, and the first sealing faces 30, 50 define a ledge for the surface close to the end of the fuel cell tubes to adhere to the end fitting. The second sealing face 32, 52 defines the surface to which the end of the fuel cell tube adheres. The connection between the second sealing face and the end of the fuel cell tube forms a gas tight channel between the fuel cell tube and the end fitting.

Figure 13:
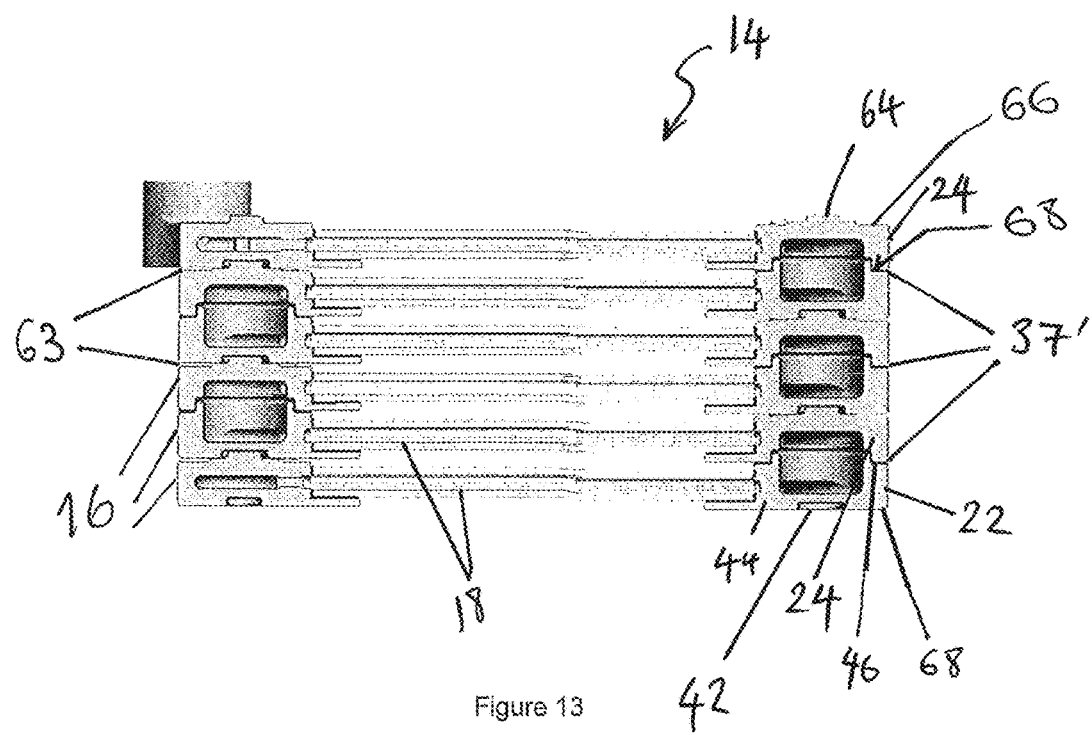
FIG. 13 shows a section view of a bundle.

The height of the second sealing face 32, 52 is greater than the height of the fuel cell tubes 18. The difference in height provides a clearance between the fuel cell tube of one tube sub-assembly and the end fitting of an adjacent tube sub-assembly, and prevents any compressive forces due to expansion or contraction of the components of the tube sub-assemblies propagating between adjacent tube sub-assemblies as shown in FIG. 13.

A tube edge alignment spigot 40, 60 is located on the second sealing face 32, 52 to enable easy alignment of the fuel cell tube 18 during manufacture of the tube sub-assemblies 16.

A tube edge alignment spigot 40, 60 may also be located on the first sealing face 30, 50 to enable easy alignment of the fuel cell tube 18 during manufacture of the tube sub-assemblies 16.

Alternatively, both first and second sealing faces may be provided with tube alignment spigots 40, 60 to improve fuel cell tube 18 alignment during manufacture of the tube sub-assemblies 16.

The end fittings provide a gas tight channel for reactant to flow from one tube sub-assembly to an adjacent tube sub-assembly. The end fittings are provided with structural support pillars 38, 58, the space between the support pillars provides the channels for the flow of reactant. Alternative arrangements may also provide structural support of the end fittings.

The support pillars 38, 58 improve reactant distribution throughout the fuel cell tubes 18 by forming a plurality of channels to distribute fuel. The pillars 38, 58 are positioned such that the aperture between two neighbouring pillars 38, 58 provides a channel having an orifice 39 (not labelled on FIG. 4), 59 for the passage of reactant. The size and shape of the channels and orifices 39, 59 are adapted such that a predetermined pressure drop of reactant from the main flow of reactant in the end fitting is delivered to the fuel cell tube 18. The flow distribution of the reactant within the fuel cell tubes 18 can therefore be controlled by the pillars 38, 58 within the gas tight fuel path and within the tube sub assembly 16 and bundle 14. By controlling the flow of reactant at the fuel cell tube level, mechanical and thermal stresses in the fuel cell tubes are reduced by preventing large pressure drops from the end fittings to the fuel cell tubes.

In order to benefit from improving manufacturing tolerances throughout the entire strip, each modular component may comprise features that in combination reduce the problems associated with aligning different components. For example, the first end fitting and the second end fitting have compatible alignment features which contribute to improving the alignment between the two end fittings. The first end fitting has an alignment feature compatible with an alignment feature of the second end fitting, and together the alignment features provide alignment between the first end fitting and the second end fitting.

There are many possible alignment features that could be used to improve alignment between the first and second end fittings as shown in FIGS. 4 to 9. One such feature uses the fuel inlet or outlet channel of the first and second end fittings to locate and align each other. The alignment feature of the first end fitting is a central spigot 34, for example, providing a connection for the gas tight fuel channel between the first and second end fittings 22, 24. In such an arrangement, the alignment feature of the second end fitting is a central location socket 62, adapted to marry with the central spigot 34 to form the gas tight channel for flow of reactant between the first and second end fitting 22, 24. The lower surface 68 of the end fitting 24 thus abuts pads located on the upper surface 46 of an adjacent end fitting 22 or alternatively directly onto surface 46. The spigot 34 does not need to be centrally located; however an additional benefit of a centrally located spigot 34 is that during manufacture of the tube sub-assembly 16, the central spigot 34 helps to define axial alignment between adjacent tube sub-assemblies 16.

Figure 9:
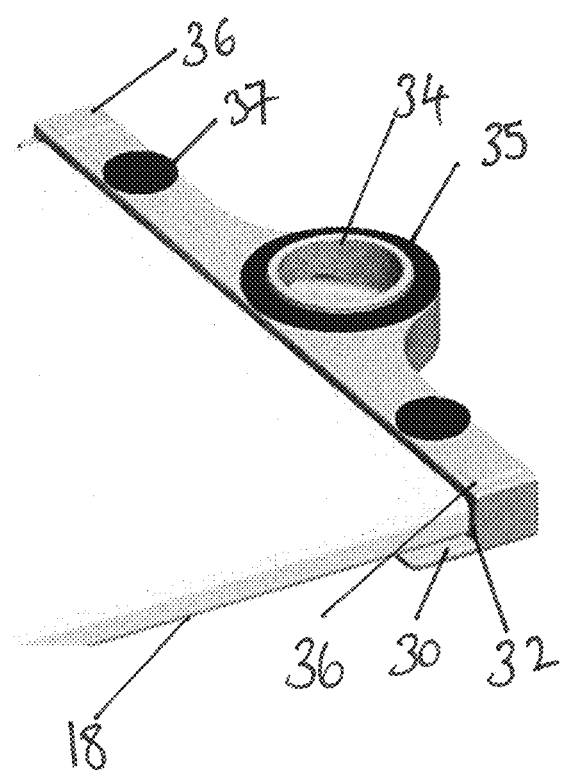
FIG. 9 shows a partial view of the tube sub-assembly.

The alignment features are used to provide a gas tight channel between adjacent tube sub-assemblies 16. The central spigot 34 and the central location socket 62 are aligned and sealed to define the gas tight channel between the first end fitting and the second end fitting 22, 24. In order for a gas tight channel to be realised, the central spigot 34 has a glass ceramic tape cast sealing gasket 35 as shown in FIG. 9, to provide a gas tight bond with the central location socket 34.

Hooks 61 may be provided on each end fitting to provide means for attaching the tube sub-assemblies to external hardware as required.

The end fittings provide a plurality of channels for the flow of reactant 28.

Figure 10A:
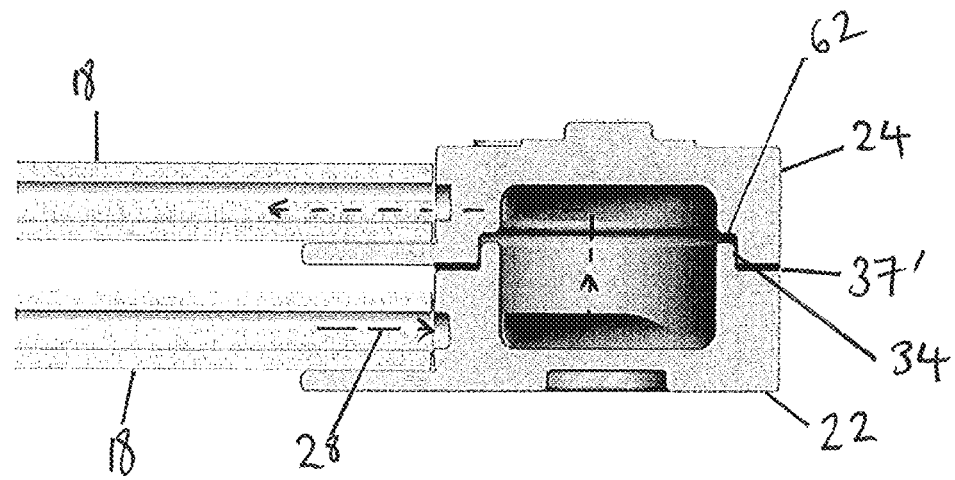
FIG. 10a shows a section view of a bonded joint of adjacent tube sub-assemblies using alternative end fittings as shown in FIGS. 11 and 12.
Figure 10C:
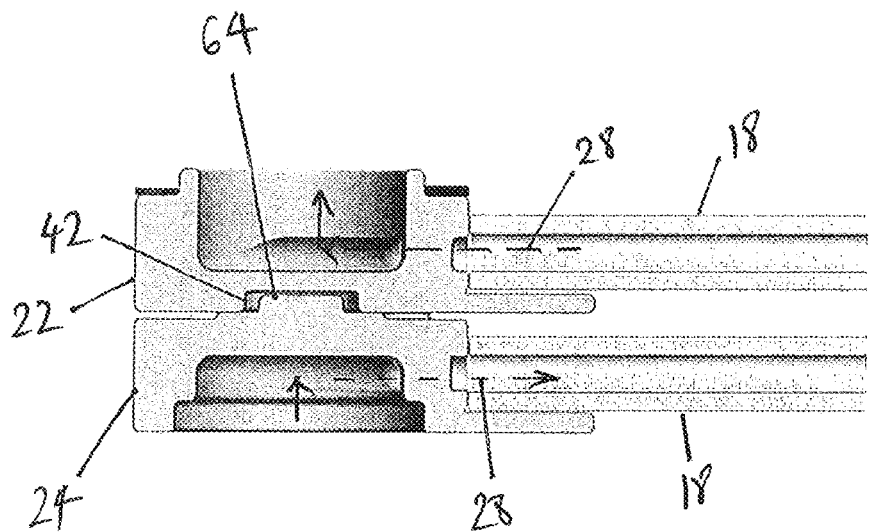
FIG. 10c shows a section view of a bonded joint for adjacent tube sub-assemblies using end fittings as shown in FIG. 8.
Figure 10B:
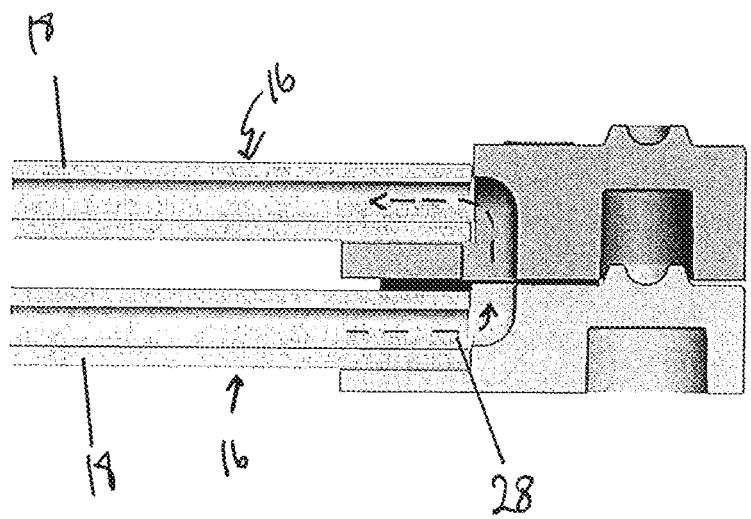
FIG. 10b shows a bonded joint of adjacent tube sub-assemblies using end fittings as shown in FIG. 8.

FIGS. 10a and 10c shows a bonded joint between two fuel cell tube sub-assemblies and shows the full flow path 28 from the exit of one tube into the next tube above. Contact pad 36 controls the thickness of the ceramic glass joint 37'. The control pad performs an important function of controlling the strip height and therefore the height of the control pad is accurately formed during manufacture of the end fittings. Using the end fitting thickness to control the overall strip height reduces the importance of the fuel cell tube thickness and tube to end fitting bond thickness thereby simplifying manufacturing processes and requirements.

FIG. 10c shows a section through a bonded joint between the fuel cell tube sub-assemblies using end fitting 22 as shown in FIGS. 4 and 5 and end fitting 24 as shown in FIGS. 6 and 7.

FIG. 10c shows the flow path 28 of reactant or fuel through the fuel cell tubes 18 and the end fittings 22, 24. The central spigot 34 couples with the central location socket 62 to provide the main flow path through the end fittings. A gas tight ceramic glass joint 37' seals the central spigot 34 and the central location socket 62 to ensure the connection between end fitting 22 and end fitting 24 is gas tight.

Figure 10D:
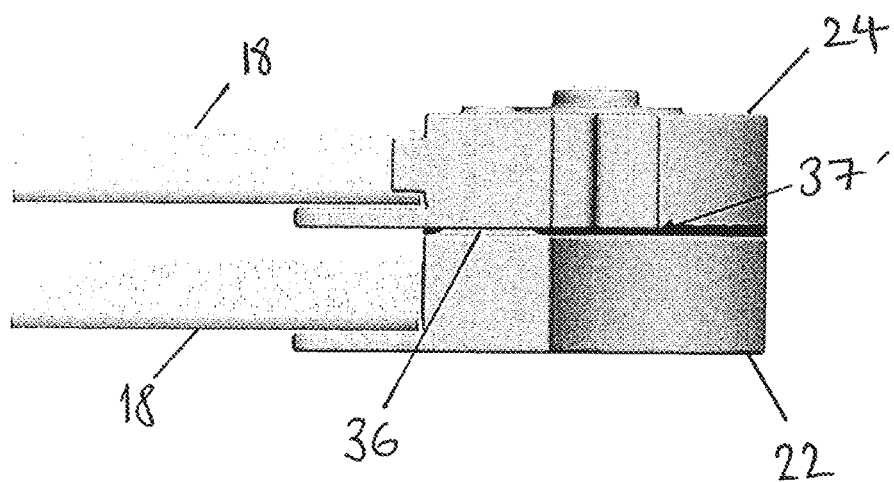
FIG. 10d shows a non-bonded joint for adjacent tube sub-assemblies using end fittings as shown in FIG. 8.

FIG. 10d shows a section through a non-bonded end joint 63 between tube sub-assemblies. The location pin 64 of one end fitting 24 slots into location socket 42 of an adjacent end fitting 22.

Figure 11:
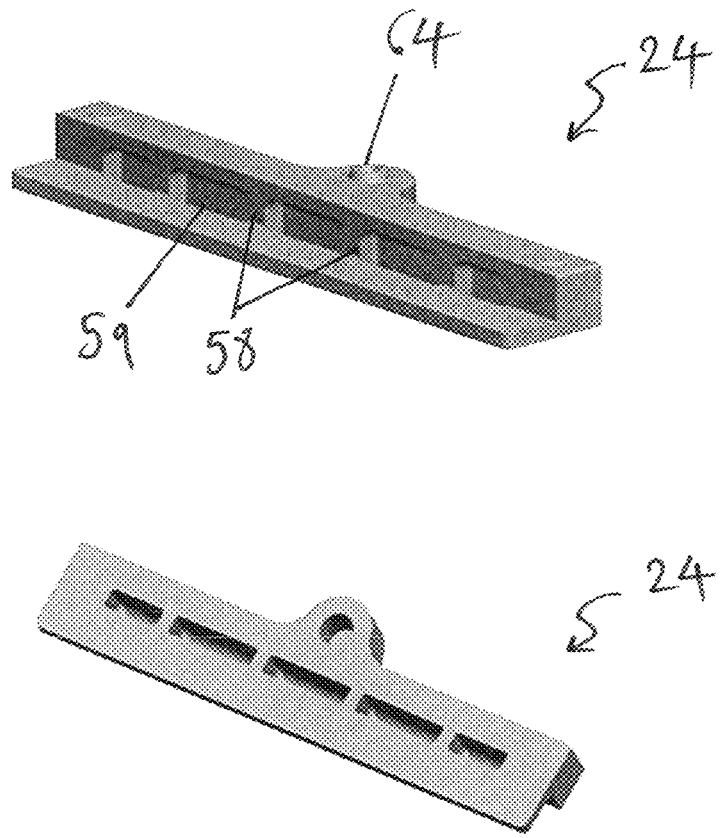
FIG. 11 shows two views of an alternative first end fitting.

FIG. 11 shows a second type end fitting 24 providing several flow paths (i.e. channels) 28 for flow of reactant. The channels are formed by the pillars 58 and the orifice 59. The number of channels and the size and shape of the channels is dependent on the desired pressure of the flow of fuel in the fuel cell tube.

Figure 12:
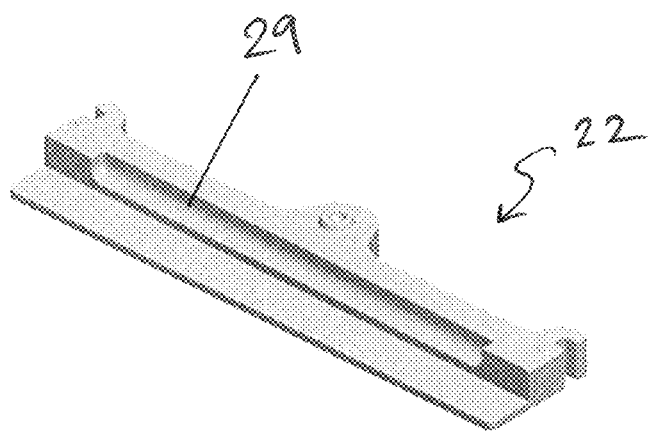
FIG. 12 shows two views of an alternative end fitting.

FIG. 12 shows a first type end fitting 22 with a single elongated reactant connection path 29. It should be understood that an end fitting having a plurality of channels may be coupled to an end fitting having a single elongated reactant flow path (channel). Such a combination is still able to control the flow distribution of reactant through the fuel cell tube, because the plurality of channels contribute to controlling the flow of reactant.

It has been described above how adjacent first and second end fittings couple to provide gas tight connection between adjacent tube sub-assemblies. However, because a serpentine flow path is required throughout the bundle of tube sub-assemblies, if the first end of a tube sub-assembly is connected to the first type end fitting, then the opposing end of the tube sub-assembly is connected to a second type end fitting. Preferably, first type end fittings and second type end fittings are only permanently bonded around the gas tight channel. The alternate end fitting couplings are non-bonded. This ensures that mechanical tolerance is provided within the bundle since the opposing end of the tube sub-assemblies remain only constrained and not bonded in a fixed position.

FIG. 13 illustrates a bundle 14 of six tube sub-assemblies 16. Some of the end fittings are bonded 37' to adjacent end fittings while others are non-bonded 63.

The first end fitting 22 has an upper mounting surface 46 and a lower abutting surface 44 for mounting and abutting adjacent end fittings respectively.

The second end fitting 24 has an upper abutting surface 66 and a lower mounting surface 68 for abutting and mounting adjacent end fittings respectively.

The mounting surfaces 46, 68 of the first and second type end fittings are provided with bond thickness control pads 36, 56 to control the thickness of the bonded joints between adjacent end fittings. The bond thickness control pads are more easily identified on FIGS. 4 and 6.

The upper mounting surface 46 of the first end fitting 22 is irremovably conjoined to the lower mounting surface 68 of the second end fitting 24 using a ceramic glass paste 37 to form a glass ceramic joint 37'. The end fittings are then sintered to irreversibly bond the surfaces together and to provide a gas tight seal between the two mounting surfaces.

To improve thermal and mechanical tolerance, alternate end fittings are constrained in a particular position and are non-bonded as shown in FIG. 10d.

The upper abutting surface 66 of the second end fitting 24 is provided with a location pin 64 as shown in FIG. 8 and FIG. 11.

The lower abutting surface 44 of the first end fitting is provided with a location socket 42 as shown in FIG. 5 or an elongated socket 42 as shown in FIG. 12.

The location pin 64 and the location socket 42 provide positive alignment for non-bonded coupling 63 of the second and first end fitting 22, 24. Abutment between the first and second end fitting is a non-bonded coupling 63 to help accommodation thermal expansion of the bundle from start-up at room temperature to the operating temperature of the fuel cell stack.

The location pin 64 is cylindrical. A cylindrical location pin 64 and larger elongated socket 42 provide latitudinal confinement between adjacent tube sub-assemblies while allowing a predetermined degree of longitudinal motion between adjacent tube sub-assemblies. Other shapes of location pin and location socket adapted to provide confinement in a particular direction between adjacent end fittings, while allowing limited movement in another direction, are also envisaged.

As described above, several types of end fitting are required in order to build a fuel cell stack, strip and bundle in a modular manner. For example, a bundle may comprise two, four, six or more tube sub-assemblies. Odd numbers are also envisaged, however, this would require fuel pipes on both sides of the fuel cell strip.

Figure 14:
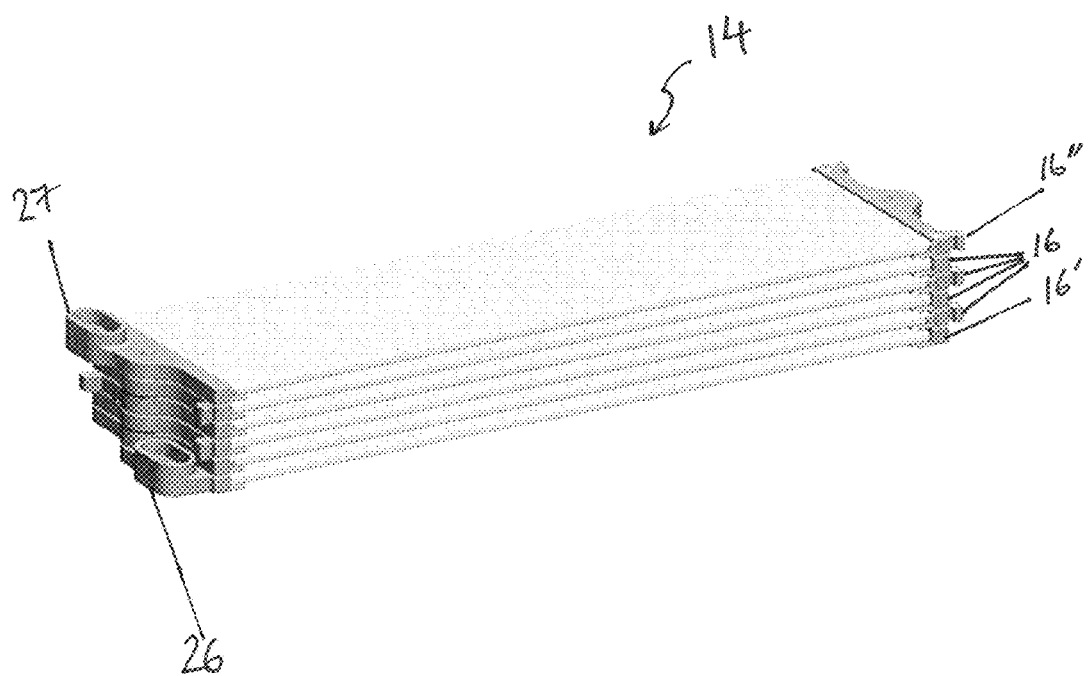
FIG. 14 shows a 3D perspective view of a bundle.
Figure 18:
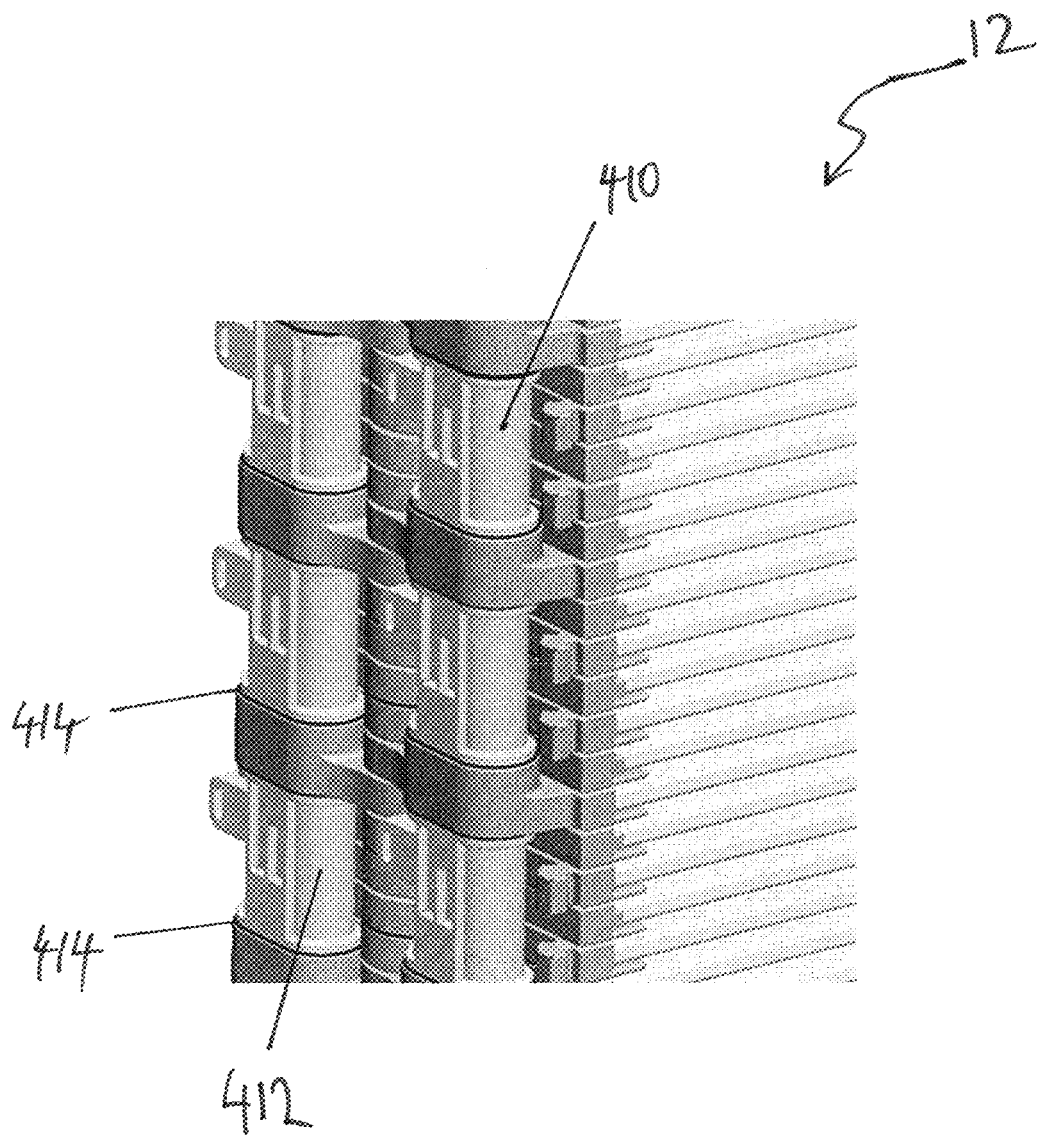
FIG. 18 shows a strip assembly.

FIG. 14 shows a perspective view of the bundle assembly. The uppermost tube sub assembly 16" and lowermost tube sub assembly 16' are provided with means for connecting the bundle to the main strip feed pipes 410 and 412 as shown in FIG. 18. The bundle has means for reactant inlet and reactant outlet from the lowermost 16' to the uppermost 16" tube sub-assemblies, and therefore through the bundle 14. The end fitting on the terminating end of the lowermost 16' and uppermost 16" tube sub-assembly has means for connecting to the main strip fuel feed pipe 410 and 412. FIG. 14 illustrates a bundle with six tube sub-assemblies, a lowermost 16', uppermost 16" and four inner tube sub-assemblies 16. The lowermost tube sub-assembly 16' has means for reactant inlet via inlet manifold end fitting 26 and the uppermost tube sub-assembly 16" has means for reactant outlet via an outlet manifold end fitting 27.

FIGS. 15 to 18 show the manifold end fittings and strip assembly in more detail. The manifold end fittings 26, 27, comprise reactant manifolds 234, 334 to provide a gas tight fuel channel to a main strip fuel pipes 410, 412 to allow reactant to flow through the lowermost tube sub-assembly, through the inner tube sub-assemblies of the bundle and through the uppermost tube sub-assembly such that thermal and mechanical stresses in the solid oxide fuel cell stack are reduced. The arrangement may also be reversed such that the reactant flows through the uppermost tube sub-assembly to the lowermost tube sub-assembly.

Figure 15:
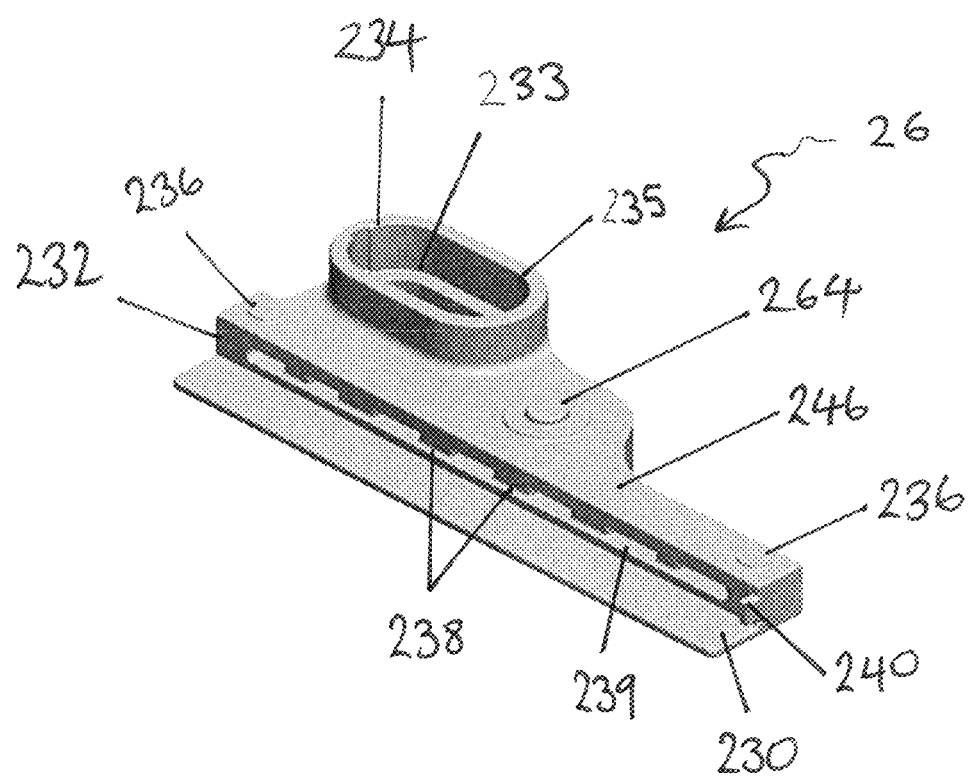
FIG. 15 shows a fuel manifold end fitting.
Figure 16:
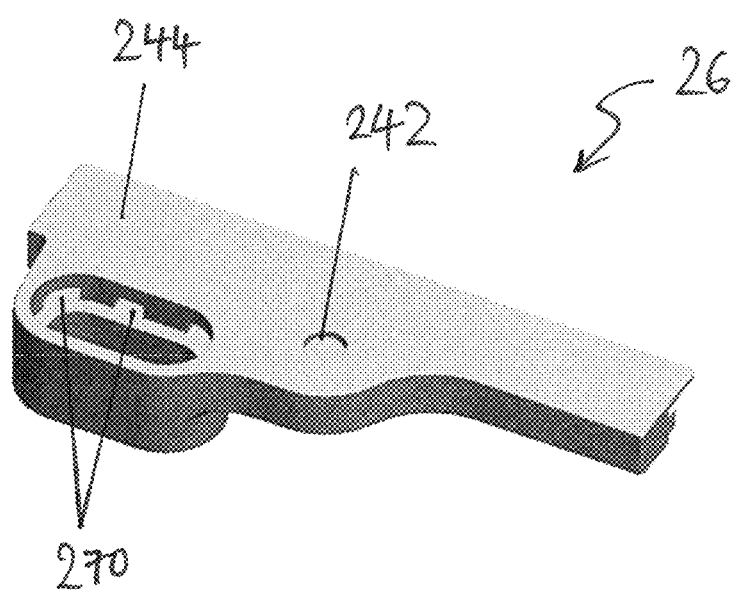
FIG. 16 shows a fuel manifold end fitting.

The inlet manifold end fitting 26 has an upper abutting surface 246 and a lower abutting surface 244 (see FIGS. 15 and 16). The inlet manifold end fitting 26 provides a gas tight channel for reactant to flow from the end fitting to the fuel cell tube of the lowermost tube sub-assembly. The manifold end fittings are complete end fittings and the channel does not require subsequent components to make it complete unlike the first and second end fittings described above which require both a first and second end fitting to form a gas tight channel. Therefore, the inlet manifold end fitting does not have a mounting surface as it does not need to be bonded to an adjacent tube sub-assembly. Instead, the inlet manifold end fitting is provided with upper 246 and lower 244 abutting surfaces; the lower abutting surface 244 is provided with a location socket 242 and the upper abutting surface 246 is provided with a location pin 264.

The alignment features 242, 264 of the inlet manifold end fitting are much the same as the alignment features of the abutting surfaces of the first and second end fittings.

The location pin 264 and the location socket 242 provide positive alignment for non-bonded coupling of the inlet manifold end fitting to the adjacent tube sub-assembly either from the same bundle or from an adjacent bundle. The abutment between the inlet manifold end fitting and first and second end fittings of the adjacent tube sub-assemblies are non-bonded to help accommodation thermal expansion of the bundle from start-up at room temperature to the operating temperature of the fuel cell stack. It is especially important close to the strip fuel pipes as a greater temperature gradient exists close to the strip fuel pipes. Furthermore, mechanical stresses due to fuel pressure contribute to additional mechanical stresses experienced near or in the region of the strip fuel pipes.

The location pin 264 is cylindrical. A cylindrical location pin 264 coupled with a larger cylindrical socket 242 provide latitudinal confinement between adjacent tube sub-assemblies while allowing limited longitudinal motion between adjacent tube sub-assemblies. Other shapes of location pins are also envisaged where the motion between adjacent sub-assemblies is constrained in one direction and allowed a small amount of motion in another direction.

Figure 17:
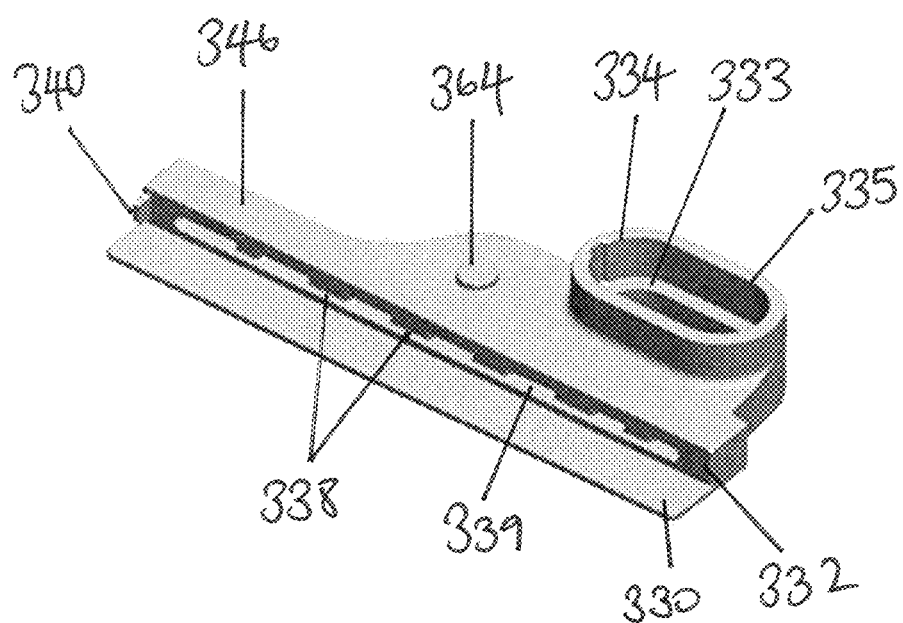
FIG. 17 shows a fuel manifold end fitting.

Similarly, the outlet manifold end fitting has an upper abutting surface 346 and a lower abutting surface 344, as shown in FIG. 17. The outlet manifold end fitting provides a gas tight channel for reactant to flow from the terminating end of the uppermost tube sub-assembly to the outlet manifold end fitting. The channel does not require subsequent components to make it complete unlike the first and second end fittings described above. Therefore, the outlet manifold end fitting does not have a mounting surface as such, as it does not need to be bonded to an adjacent tube sub-assembly. Instead, the outlet manifold end fitting is provided with upper 346 and lower 344 abutting surfaces; the lower abutting surface 344 being provided with a location socket (not shown) and the upper abutting surface 346 being provided with a location pin 364.

The alignment features 342, 364 of the outlet manifold end fitting are much the same as the alignment features of the abutting surfaces of the first and second end fittings as shown in FIGS. 4 and 6 for example.

The location pin 364 and the location socket 342 provide positive alignment for non-bonded coupling of the outlet manifold end fitting to the adjacent tube sub-assembly either from the same bundle or from an adjacent bundle. The abutment between the outlet manifold end fitting and first or second end fittings of the adjacent tube sub-assemblies are non-bonded to help accommodation thermal expansion of the bundle from start-up at room temperature to the operating temperature of the fuel cell stack. It is especially important close to the main strip feed pipe as a greater temperature gradient may be experienced close to the main strip feed pipe. Furthermore, mechanical stress due to fuel pressure may also contribute to additional mechanical stresses experienced near or in the region of the reactant feed pipes (i.e. main strip fuel pipes).

The location pin 364 is cylindrical. A cylindrical location pin 364 and larger cylindrical socket 342 provide latitudinal confinement between adjacent tube sub-assemblies while allowing limited longitudinal motion between adjacent tube sub-assemblies.

As with the first and second type end fittings, the inlet and outlet manifold end fittings also have the features of bond thickness control pads 236, first sealing face 230, 330, and second sealing faces 232, 332, and pillars 238, 338 forming a plurality of channels.

Improved alignment between bundles within the strip and alignment of the bundle to the main strip feed pipes is achieved through a fuel pipe location feature 234, 334 within the manifold end fittings. Sockets 235, 335 and flanges 233, 333 locate and bond the manifold to the inlet pipe 410 and outlet pipe 412 via gas tight joints 414, as shown in FIG. 18. The gas tight joints 414 are formed using tape cast gaskets and ceramic glass for creating a seal during sintering of the tube sub-assembly.

Fuel feed channels 270 within the inlet manifold end fitting are sized to achieve a desired pressure drop from the fuel inlet pipe pressure.

Figure 19A:
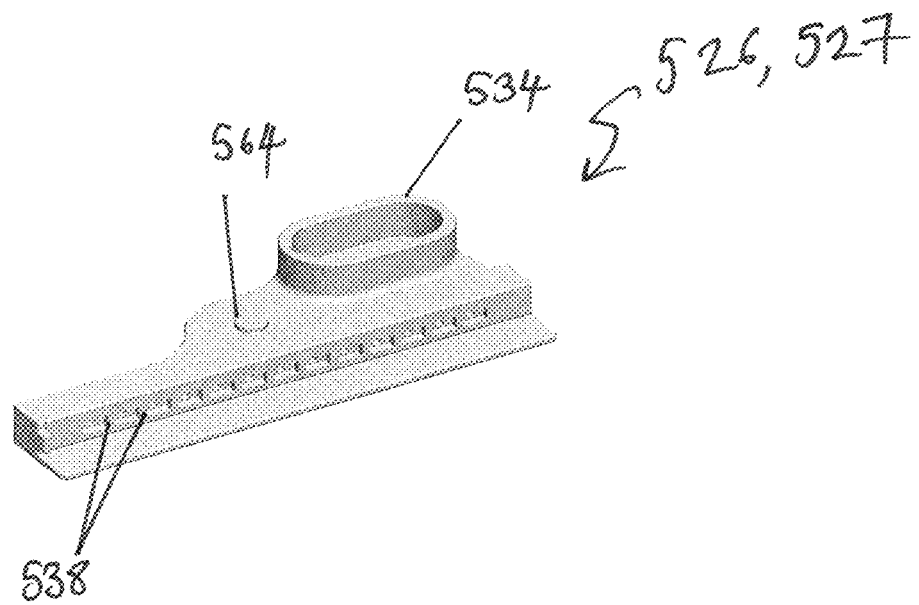
FIG. 19a shows a fuel manifold end fitting.
Figure 19B:
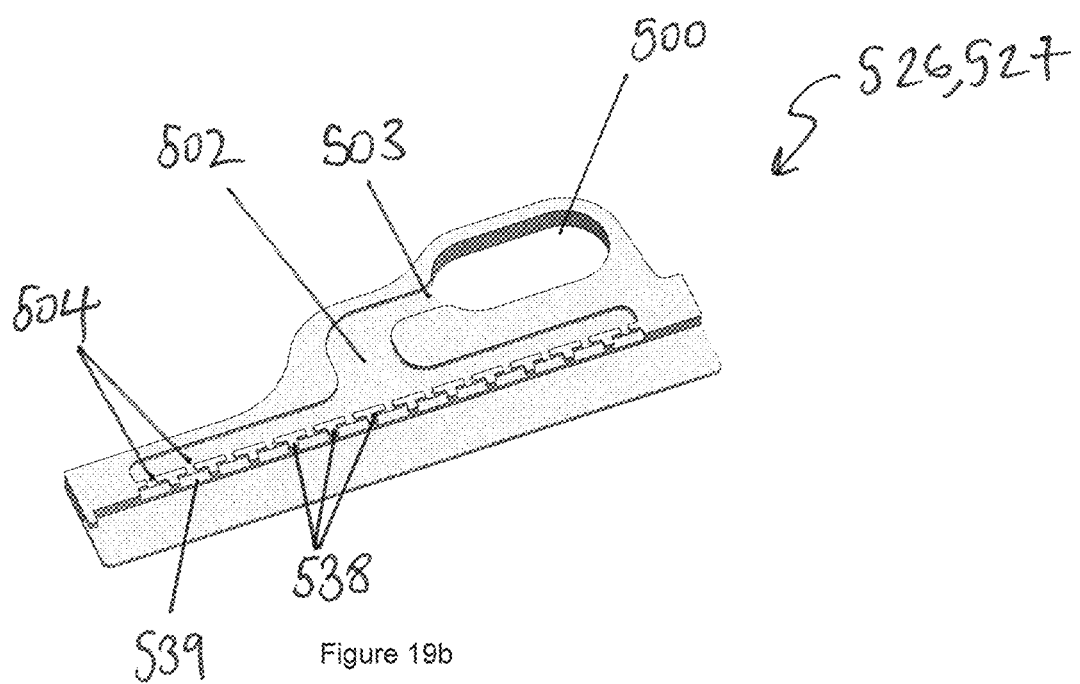
FIG. 19b a section through a fuel manifold end fitting.

FIGS. 19 to 21 show alternative embodiments of manifold end fittings with different pillar arrangements providing different channel arrangements. The pillars are used to support the structure of the end fitting but are also designed to provide a channel for the inlet reactant. FIG. 19a shows one such embodiment of a manifold end fitting 526, 527. FIG. 19b shows a section through the manifold end fitting 526, 527. A fuel pipe 510, 512 (not shown, but as shown in FIG. 18, 410, 412) is connectable to the manifold end fitting such that the manifold 534 forms a portion of a fuel pipe 500. The manifold 534 is connected to the fuel pipe 500 via tape cast sealing gaskets formed from ceramic glass to provide gas tight joints.

The fuel connector 503 provides an orifice for flow of fuel at the manifold 534 and provides an intermediate channel 502 for fuel. The intermediate channel 502 is configured to achieve a desired pressure drop from the fuel pressure in the fuel pipe 500 to the channel between the pillars 538. The pillars are spaced apart providing multiple apertures 504 for the channels, and orifices 539 of the channels. The channels provide a control for the pressure and thus fuel flow into the channels 20 of the fuel cell tube. Both the apertures 504 and the orifices 539 are designed to achieve a required flow distribution from the manifold end fitting to the fuel cell tube.

Figure 20A:
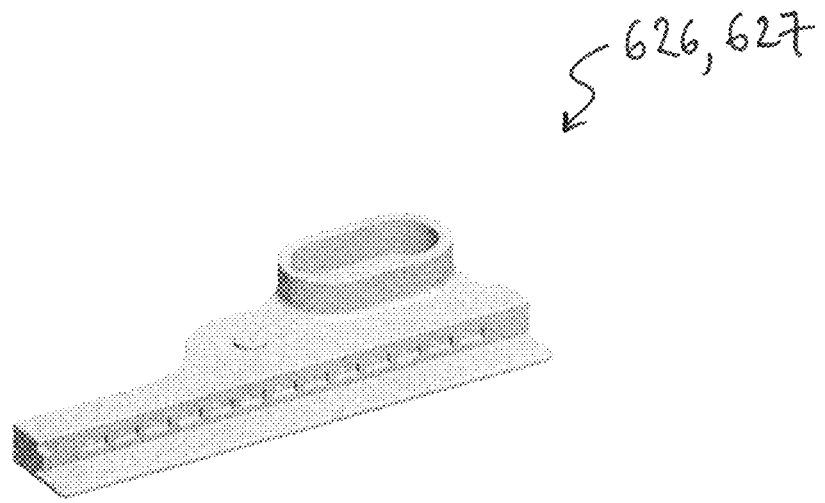
FIG. 20a and FIG. 20b show a further fuel manifold end fitting.
Figure 20B:
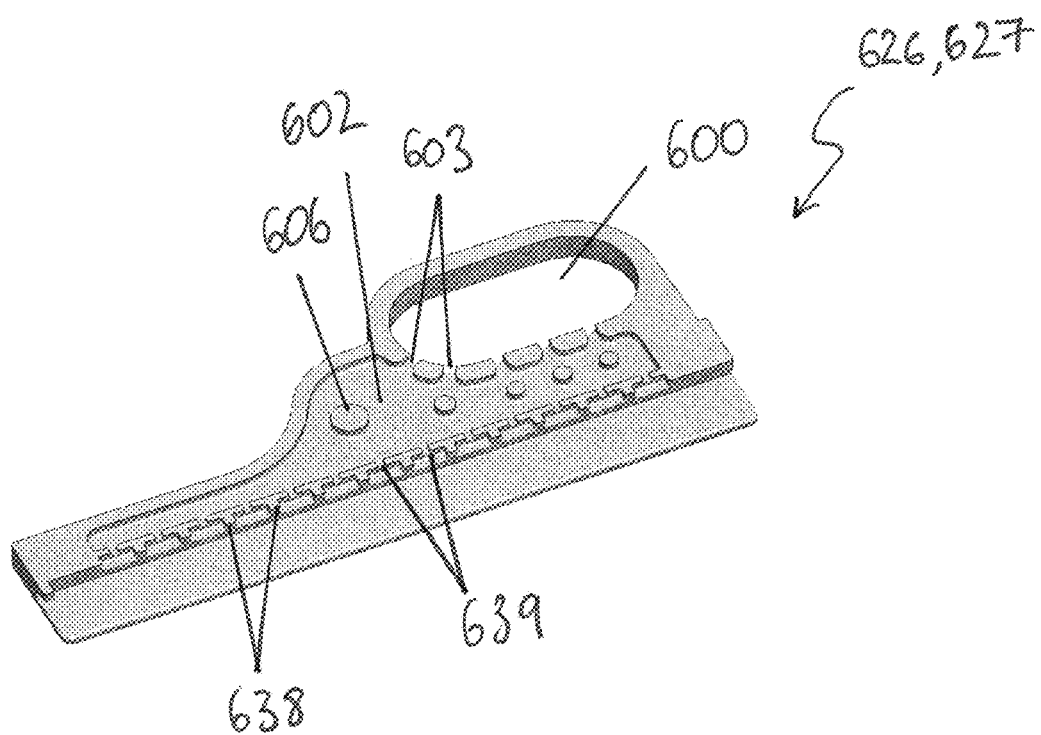

FIGS. 20a and 20b show an alternative manifold end fitting arrangement 626, 627. In this arrangement the fuel pipe portion 600 is connected to the intermediate channel 602 via fuel connectors 603. These fuel connectors are adapted to induce a pressure drop from the fuel pipe to the end fitting and therefore within the fuel cell tubes. Support pillars 606 within the intermediate channel 602 contribute to the fuel flow dynamics and fuel distribution in the end fitting while also providing structural support within the end fitting.

Figure 21A:
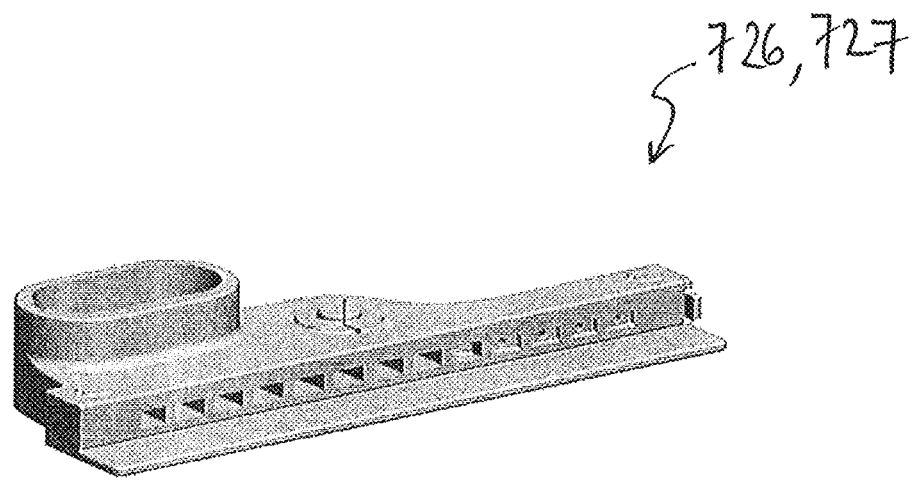
FIG. 21a and FIG. 21b show an alternative fuel manifold end fitting.
Figure 21B:
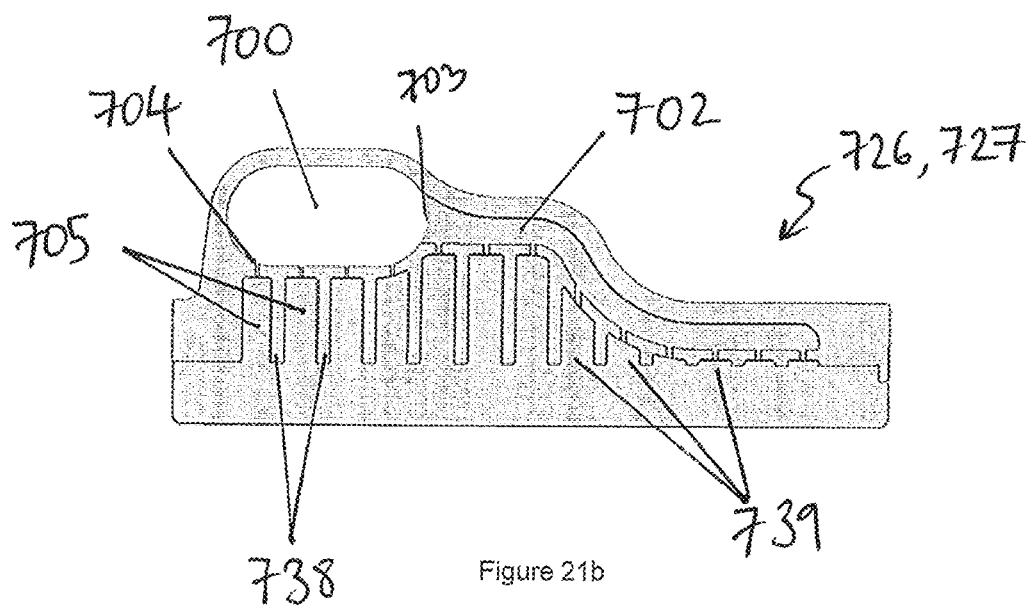

FIGS. 21a and 21b show an alternative manifold end fitting arrangement 726, 727. In this embodiment the fuel connector 703 is arranged to connect the fuel pipe portion 700 to the intermediate channel 702, or the fuel pipe connects directly to the apertures 704 of the channels 705. The pillars 738 provide differing channel 705 lengths depending on the proximity of the channel to the fuel pipe or main strip fuel pipe. This arrangement provides a predetermined fuel pressure at each orifice 739 and the channel size can be varied to control the fuel pressure at each orifice. An advantage of this arrangement is that a constant fuel pressure may be provided at each orifice 739.

Figure 22B:
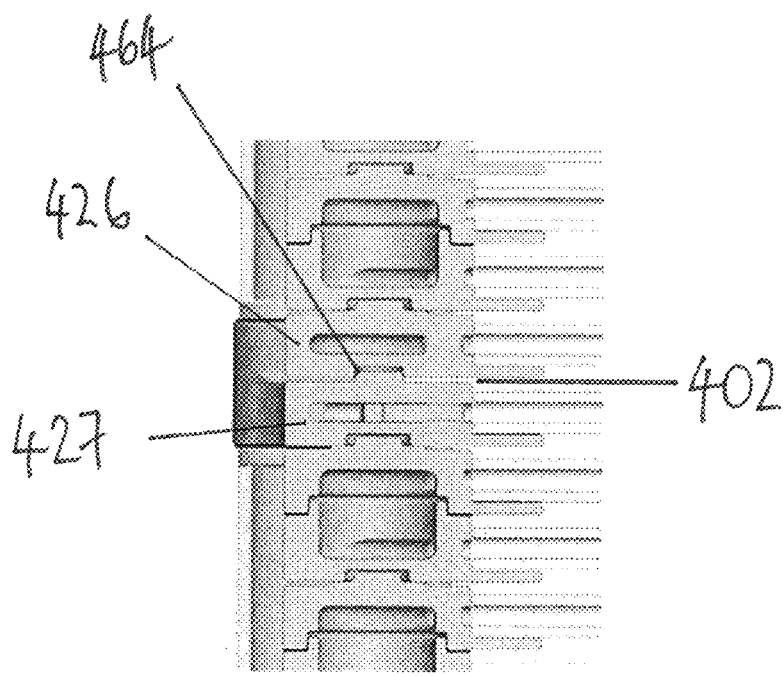
Figure 22C:
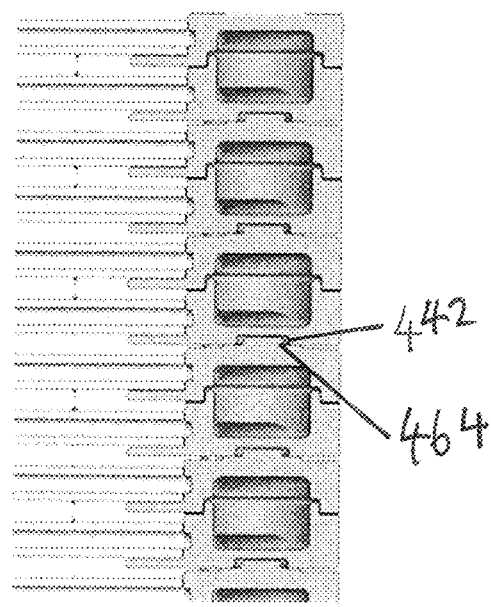

To improve mechanical and thermal compliance throughout the strip, an expansion gap 402 is provided between adjacent bundles. FIG. 22a shows a section through the strip inlet fuel feed manifold. An expansion gap 402 is achieved between the manifold end fitting 426 and another manifold end fitting 427 (not shown) by using a removable spacer between the upper abutting surface 446 of the outlet manifold end fitting and the lower abutting surface 444 of the inlet manifold end fitting. The spacer is removed after the bundles are sintered and the expansion gap between two adjacent bundles provides additional thermal and mechanical tolerance of the strip by preventing mechanical and thermal stresses from propagating to adjacent bundles.

Each bundle is connectable to a main strip fuel pipe, via the inlet or outlet manifold end fitting.

The end fittings are manufactured from a material having a coefficient of thermal expansion (CTE) of the end fitting matched to the CTE of the fuel cell tubes. Solid oxide fuel cells require operating temperatures of around 700° C. to around 1000° C. to achieve the required electrolyte performance within the active fuel cells. Large temperature variation can cause large expansion and contraction of components and a mismatch in the CTE can have catastrophic consequences to the mechanical and thermal integrity of the stack 10. Temperature variances are found throughout the fuel cell stack and throughout the tube sub-assemblies even at normal operating temperatures. Therefore, by matching the CTE of the end fittings with the CTE of the fuel cell tubes, mechanical stresses induced by thermal variation of the tubes and end fittings are reduced.

The end fittings are made from an impervious material such as a magnesia magnesium aluminate (MMA) ceramic material. Any material being impervious, capable of withstanding the operating temperatures of the fuel cell stack and with a coefficient of thermal expansion matched to the CTE of the fuel cell tubes is suitable for producing the end fittings. Furthermore, the impervious end fittings are able to bear larger compressional loads when compared with the more delicate fuel cell tubes.

The end fittings are typically produced via an injection moulding process. Injection moulding is a widely utilised manufacturing process for producing parts using precision-machined moulds to form geometrically accurate parts.

Alternatively, the end fittings may be produced using press moulding. Press moulding or a pressing process provides similarly geometrically accurate parts as required by embodiments of the present invention.

It will be clear to a person skilled in the art that features described in relation to any of the embodiments described above can be applicable interchangeably between the different embodiments. The embodiments described above are examples to illustrate various features of the invention Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A solid oxide fuel cell stack comprising of at least one fuel cell strip,
   each strip comprising a plurality of bundles,
   each bundle comprising a plurality of tube sub-assemblies,
   each tube sub-assembly comprising a fuel cell tube,
   each fuel cell tube having at least one passage extending longitudinally through the fuel cell tube, adjacent tube sub-assemblies being arranged substantially parallel and spaced apart, and
   at least one end of each tube sub-assembly being connected to an end of an adjacent tube sub-assembly via respective end fittings and providing a gas tight path for reactant to flow from the fuel cell tube to the adjacent fuel cell tube through a plurality of orifices arranged in parallel with respect to the flow of reactant,
   wherein one end of each tube sub-assembly comprises a first type end fitting, the opposing end of each tube sub-assembly comprises a second type end fitting, and wherein the first type end fitting of one tube sub-assembly and the second type end fitting of an adjacent tube sub-assembly are connected to provide a conduit between the fuel cell tubes of adjacent tube sub-assemblies,
   wherein the first type end fitting has an upper mounting surface and a lower abutting surface for mounting and abutting adjacent end fittings, and the second type end fitting has an upper abutting surface and a lower mounting surface for abutting and mounting adjacent end fittings.

2. The solid oxide fuel cell stack as claimed in claim 1, wherein the at least one end fitting comprises a plurality of channels and at least one channel forms a gas tight conduit from the fuel inlet or the fuel outlet to the fuel cell tubes.

3. The solid oxide fuel cell stack as claimed in claim 1, wherein the at least one end fitting comprises a fuel inlet or a fuel outlet.

4. The solid oxide fuel cell stack as claimed in claim 1, wherein a coefficient of thermal expansion (CTE) of the at least one end fitting is matched to a CTE of the solid oxide fuel cell tubes.

5. The solid oxide fuel cell stack as claimed in claim 1, wherein the at least one end fitting comprises magnesia magnesium aluminate (MMA) ceramic material.

6. The solid oxide fuel cell stack as claimed in claim 1, wherein the first type end fitting has a first alignment feature engageable with a second alignment feature of the adjoining second type end fitting, providing alignment between adjacent first type end fitting and the second type end fitting.

7. The solid oxide fuel cell stack as claimed in claim 6, wherein the first alignment feature is a central spigot forming the fuel inlet or the fuel outlet of the first type end fitting and the second alignment feature is a central location socket forming the fuel inlet or the fuel outlet of the second type end fitting.

8. The solid oxide fuel cell stack as claimed in claim 7, wherein the central spigot and the central location socket connect to form a conduit between the first type end fitting and the second type end fitting.

9. The solid oxide fuel cell stack as claimed in claim 8, wherein the central spigot has a glass ceramic tape cast sealing gasket to provide a gas tight bond with the central location socket.

10. The solid oxide fuel cell stack as claimed in claim 1, wherein the end fitting comprises first and second sealing faces being substantially perpendicular, wherein the first and second sealing faces provide a ledge to support the fuel cell tubes.

11. The solid oxide fuel cell stack as claimed in claim 10, wherein the fuel cell tubes are connected to the ledge to form a gas tight connection between the fuel cell tubes and the end fitting.

12. The solid oxide fuel cell stack as claimed in claim 11, wherein a depth of the second sealing face is greater than the fuel cell tube thickness providing a clearance between the fuel cell tubes of one tube sub-assembly and the end fitting of an adjacent tube sub-assembly.

13. The solid oxide fuel cell stack as claimed in claim 10, wherein the first sealing face has a tube edge alignment spigot and the second sealing face has a tube edge alignment spigot.

14. The solid oxide fuel cell stack as claimed in claim 1, wherein the upper mounting surface of the first type end fitting is fixed to lower mounting surface of the adjacent second type end fitting to form a bonded joint therebetween.

15. The solid oxide fuel cell stack as claimed in claim 14, wherein at least one of the upper mounting surface and the lower mounting surface are provided with a bond control pad to control the thickness of the bonded joint between adjacent end fittings.

16. The solid oxide fuel cell stack as claimed in claim 14, wherein the bonded joint is bonded with a ceramic glass paste.

17. The solid oxide fuel cell stack as claimed in claim 1, wherein the lower abutting surface of the first end fitting is provided with a location socket and the upper abutting surface of the second type end fitting is provided with a location pin.

18. The solid oxide fuel cell stack as claimed in claim 17, wherein the location socket is cylindrical and is adapted to constrain latitudinal motion between adjacent tube sub-assemblies and to allow longitudinal motion between adjacent tube sub-assemblies.

19. The solid oxide fuel cell stack as claimed in claim 17, wherein the location pin is cylindrical.

* * * * *